(12) United States Patent
Franzoi et al.

(10) Patent No.: US 8,453,793 B1
(45) Date of Patent: Jun. 4, 2013

(54) ACCOUSTIC FABRICATION SYSTEM

(75) Inventors: Eric Franzoi, Pasadena, MD (US);
Thomas Mulrooney, Towson, MD (US)

(73) Assignee: M.C. Gill Corporation, El Monte, CA (US)

( * ) Notice: Subject to any disclaimer, the term of this patent is extended or adjusted under 35 U.S.C. 154(b) by 0 days.

(21) Appl. No.: 13/445,173

(22) Filed: Apr. 12, 2012

(51) Int. Cl.
*E04B 1/82* (2006.01)

(52) U.S. Cl.
USPC ............ 181/292; 181/290; 181/284; 181/286

(58) Field of Classification Search
USPC .................................. 181/292, 290.284, 286
See application file for complete search history.

(56) References Cited

U.S. PATENT DOCUMENTS

| | | | |
|---|---|---|---|
| 2,654,686 A | 10/1953 | Hansen | |
| 3,351,760 A | 11/1967 | Brown | |
| 4,025,681 A | 5/1977 | Donnelly et al. | |
| 4,045,267 A | 8/1977 | Davis et al. | |
| 4,084,367 A * | 4/1978 | Saylor et al. ................. | 428/113 |
| 4,094,717 A | 6/1978 | Barr | |
| 4,284,457 A | 8/1981 | Stonier et al. | |
| 4,421,811 A | 12/1983 | Rose et al. | |
| 4,465,725 A | 8/1984 | Riel | |
| 5,445,861 A | 8/1995 | Newton et al. | |
| 5,869,165 A | 2/1999 | Rorabaugh et al. | |
| 5,876,652 A | 3/1999 | Rorabaugh et al. | |
| 5,944,935 A | 8/1999 | Zukas et al. | |
| 6,371,242 B1 | 4/2002 | Wilson et al. | |
| 6,440,257 B1 | 8/2002 | Zhou et al. | |
| 6,490,828 B1 * | 12/2002 | Fuller et al. .................... | 52/36.1 |
| 6,508,910 B2 | 1/2003 | Zhou et al. | |
| 6,767,606 B2 | 7/2004 | Jackson et al. | |
| 7,001,656 B2 | 2/2006 | Maignan et al. | |
| 7,205,022 B2 | 4/2007 | Colin et al. | |
| 7,434,659 B2 | 10/2008 | Ayle | |
| 7,510,052 B2 | 3/2009 | Ayle | |
| 7,854,298 B2 | 12/2010 | Ayle | |
| 8,230,969 B2 * | 7/2012 | Frederick et al. ............. | 181/293 |
| 2002/0070077 A1 * | 6/2002 | Porte et al. .................... | 181/292 |
| 2002/0079052 A1 | 6/2002 | Zhou et al. | |
| 2003/0098200 A1 * | 5/2003 | Clark ............................ | 181/292 |
| 2004/0163888 A1 * | 8/2004 | Johnson ....................... | 181/292 |
| 2005/0147790 A1 * | 7/2005 | Levavasseur ................. | 428/116 |
| 2005/0205203 A1 * | 9/2005 | Chang et al. ................ | 156/273.9 |
| 2006/0083892 A1 | 4/2006 | Wang et al. | |
| 2008/0020176 A1 | 1/2008 | Ayle | |
| 2008/0050565 A1 * | 2/2008 | Gross et al. ................... | 428/212 |
| 2008/0135329 A1 * | 6/2008 | Strunk et al. ................. | 181/214 |
| 2008/0260992 A1 | 10/2008 | Take et al. | |
| 2010/0170746 A1 * | 7/2010 | Restuccia et al. ............ | 181/290 |

FOREIGN PATENT DOCUMENTS

| | | |
|---|---|---|
| EP | 136096 | 4/1985 |
| JP | 54072284 | 6/1979 |
| JP | 2169230 | 6/1990 |
| JP | 02223434 | 9/1990 |
| JP | 03090340 | 4/1991 |
| JP | 06047850 | 2/1994 |

* cited by examiner

*Primary Examiner* — Forrest M Phillips
(74) *Attorney, Agent, or Firm* — Laura M. Lloyd; Jeffrey G. Sheldon; Sheldon Mak & Anderson, PC

(57) ABSTRACT

The invention describes a method for making a composite panel and the product made by the method. The composite panel is made from a soft septum treated with a composition containing silane and an organic acid. The treated soft septum is adhesively bonded between two honeycomb panels, forming a sandwich of the septum between the two honeycomb panels.

16 Claims, 3 Drawing Sheets

ACCOUSTIC FABRICATION SYSTEM

BACKGROUND

Two-degrees-of-freedom (2DoF) composite panels are used in aircraft jet engines to attenuate noise. In general, 2DoF structures use a porous septum to separate two chambers. It is the sonic resonance between these two chambers, attenuated by the septum, that converts noise from the engine into heat.

The chambers in the panel are typically made out of honeycomb material. The honeycomb material is commonly made from an aluminum foil or paper material and comprises an array of closely-packed hollow channels that are typically hexagonal, square or circular in shape. The acoustic impedance of the septum, combined with the height of the honeycomb, determines which frequencies of noise are absorbed and to what degree.

One type of available 2DoF honeycomb construction contains a septum inserted into the cell of the honeycomb, which is then bonded in place either mechanically or with an adhesive. (US Patent Application No. 20080251315.)

Another type of 2DoF honeycomb construction is made from two pieces of honeycomb bonded together with a structural septum in between the honeycomb pieces. (U.S. Pat. No. 4,294,329.) The structural septum can be made out of materials such as perforated aluminum and porous fiberglass. The septum in this construction is a hard layer that attenuates noise by the transfer of stress between the two layers of honeycomb.

Both of these 2DoF constructions are difficult to fabricate and involve specialized equipment. In addition, nonlaminar air flow through a perforated 2DoF septum construction (e.g. perforated fiberglass) can result in poor acoustic performance.

Laminar air flow through a soft septum, such as cloth, offers better acoustic performance than does nonlaminar air flow through a perforated hard septum. A composite panel containing a soft septum also results in good mechanical properties such as flatwise tensile strength and plate shear strength. Therefore, it is desirable to have a 2DoF composite panel with a soft woven septum separating two honeycomb panels.

It is difficult to produce a strong bond between a soft cloth septum such as PET and a honeycomb panel using aerospace grade epoxy adhesives. There are several known ways to promote adhesion with soft cloth such as, for example, corona or oxygen plasma treatment, chemical etching, and application of primer coatings. However, both corona and oxygen plasma treatments are perishable and quickly lose effectiveness. Furthermore, it would be difficult to objectively prove that a roll of cloth had been treated before use in aircraft.

Chemical etching with hot sodium hydroxide has several drawbacks. Chemical etching is a slow process, and it is difficult to fully rinse all of the caustic from the cloth after treatment. Residual sodium hydroxide could disrupt the cure of the adhesive, creating a latent flaw in the composite panel. In addition, residual sodium hydroxide could soften or corrode structures adjoining the composite panels in places that cannot be inspected.

Primer coatings can be applied to the cloth prior to adhesion, but they tend to fill in and the block the open area of the cloth, making acoustics performance unpredictable.

Prior attempts to use a soft septum in a 2DoF honeycomb construction have been unsuccessful. It is difficult to adhere a soft septum to honeycomb and still have a structure with good mechanical properties. Accordingly, there is a need for a new system of a composite panel with a soft septum that avoids the above-described problems in the prior art.

SUMMARY

The invention satisfies this need. The invention includes a method for making a 2DoF composite panel that contains a treated septum made from a soft cloth positioned between two pieces of honeycomb using traditional aerospace adhesives. The resulting structure has both good acoustic properties and good mechanical properties.

The method for making a composite panel comprises the steps of: (a) treating a septum having first and second opposed sides with a composition comprising silane and an organic acid; and (b) adhesively bonding a first honeycomb panel to the first side of the treated septum and a second honeycomb panel to the second side of the treated septum, thereby forming a sandwich of the septum between the two honeycomb panels. The step of adhesively bonding comprises applying an adhesive to the septum or the honeycomb panels or both. The adhesive can be cured by the application of heat.

The septum can be made of a polyethylene terephthalate (PET) cloth. The PET cloth can have mesh openings between 10 to 30 microns. Additionally, the PET cloth can have between 305 to 550 threads per inch. The PET cloth can have an open area of between 4 to 25%.

Alternatively, the septum can be made of nylon or polyetheretherketone (PEEK) cloth.

The silane can be an epoxy functional silane. The silane can comprise 1 to 8% by weight of the composition.

The organic acid can comprise one or more of acetic acid, formic acid, butyric acid, and citric acid.

It is also contemplated that the method for making a composite panel has a septum sandwiched between a pair of honeycomb panels, the honeycomb panels have a pair of opposed sides and a plurality of contiguous cells with interior walls, the method comprises the steps of: (a) treating the septum with a composition comprising silane and an organic acid; (b) placing a honeycomb panel on each of the opposite sides of the treated septum; and (c) with a heat curable adhesive between the panel and the treated septum, curing the adhesive.

The resulting composite panel comprises a silane treated septum sandwiched between two honeycomb panels with an adhesive adhering the septum and honeycomb panels together.

DRAWINGS

These and other features, aspects, and advantages of the present invention will become better understood with regard to the following description, appended claims, and accompanying drawings.

DESCRIPTION

Figure 1:
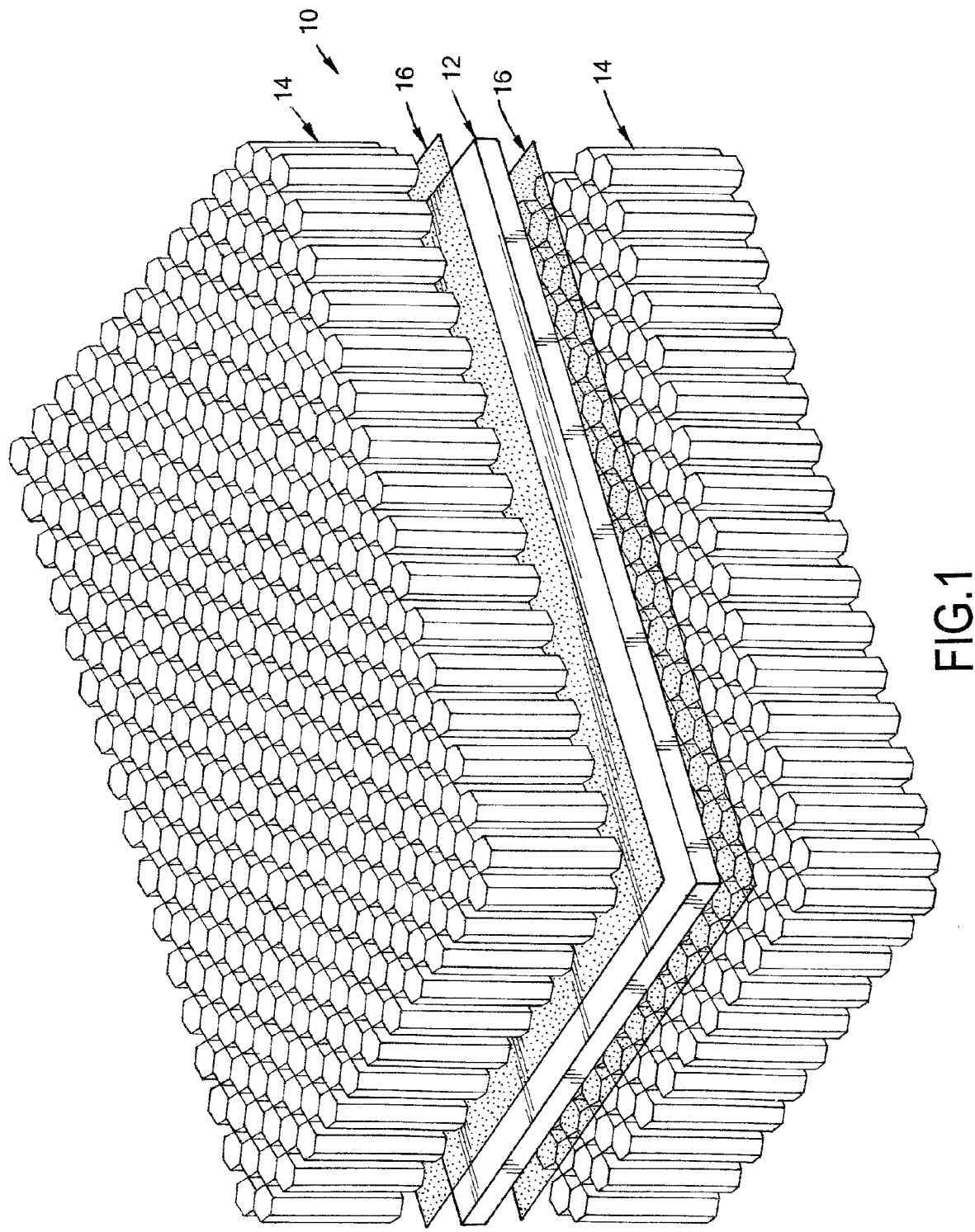
FIG. 1 depicts a perspective view of a composite panel according to one embodiment of the invention.
Figure 2:
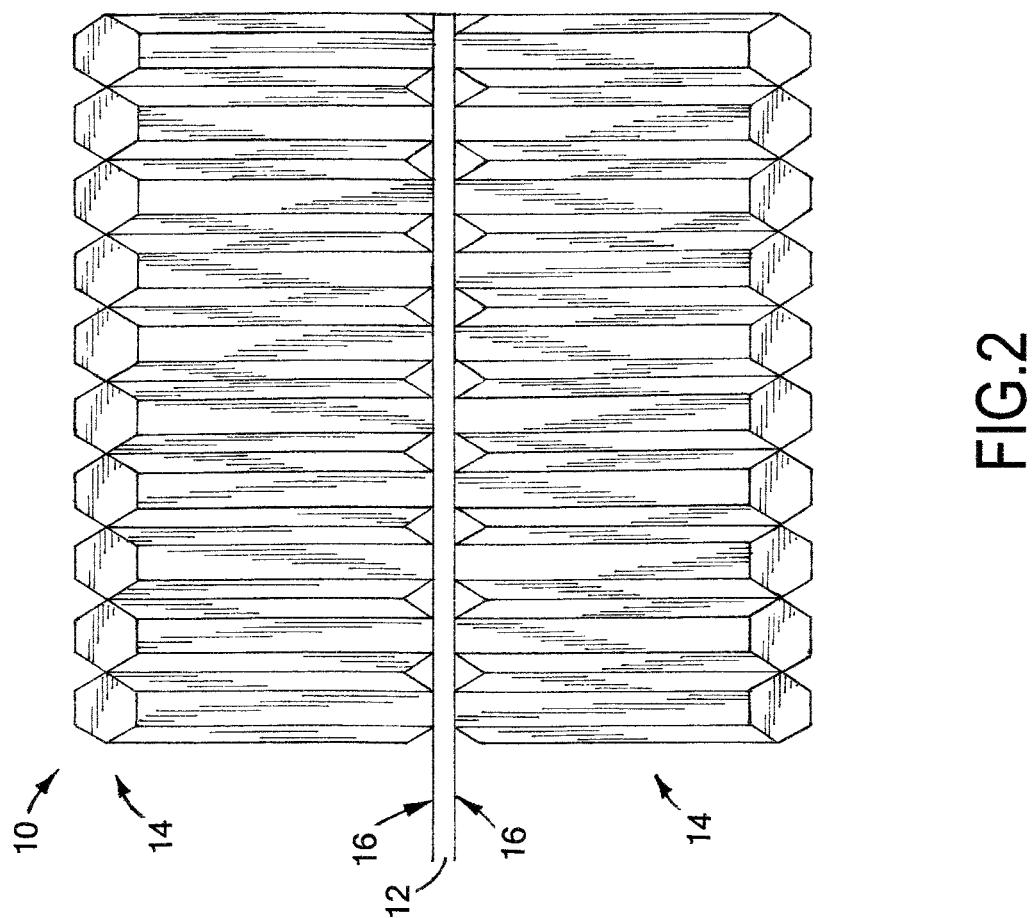
FIG. 2 depicts a side view of the composite panel according to one embodiment of the invention.
Figure 3:
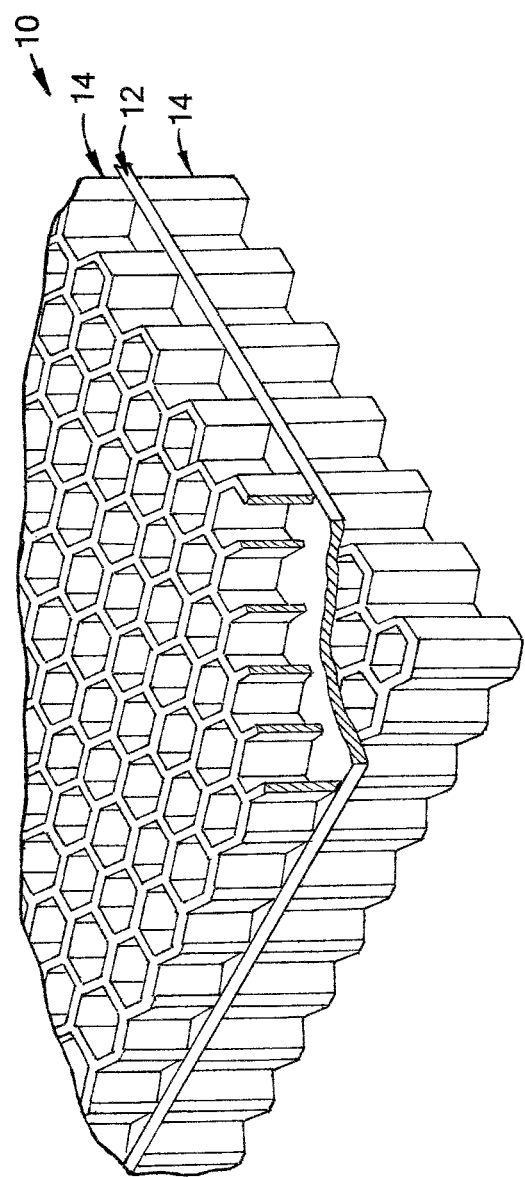
FIG. 3 is a cross-sectional perspective view of the composite panel according to one embodiment of the invention.

Composite panels made from the methods described herein have a treated soft septum sandwiched between two honeycomb panels. An adhesive adheres the septum and honeycomb panels together.

The honeycomb panel is made up of a plurality of contiguous linear hollow cells disposed in closely packed parallel relationship with one another. The cells within the honeycomb panel are typically hexagonal, rectangular or circular in cross-section, but other cross-sectional shapes can also be used. Typically, the cross-section of each cell defines an area with the maximum edge-to-edge distance of between about 3 mm and about 20 mm.

The honeycomb panel is typically made from either a metallic or non-metallic lightweight material such as aluminum foil or paper. An aramid paper impregnated with a phenolic resin is commonly used for the honeycomb panel.

The honeycomb panel has a thickness between about 6 mm and about 50 mm, depending upon the application of the composite panel in which the honeycomb core is used. It is typical for the honeycomb panel to have a density between about 32 kg/m$^3$ and about 140 kg/m$^3$. Honeycomb of aerospace quality is available from Alcore, Inc. of Edgewood, Md., Hexcel Corp. of Stamford, Conn., and M.C. GILL of El Monte, Calif. The soft septum is made out of cloth material. Typically, the cloth material has a mesh opening between 10 and 30 microns. Preferably, the cloth has a 13 micron mesh opening. The cloth contains between 305 and 550 threads per inch with thread diameters between 30 and 40 microns. The open area of the cloth material is between 5 and 25%. Preferably, the open area of the cloth material is between 4-9%.

One such cloth material is a polyethylene terephthalate (PET) cloth. PET cloth is inexpensive and readily available in a variety of mesh opening and open area combinations, such as the preferable sizes described above.

Preferably, the PET cloth has been annealed to relieve residual stress and make it dimensionally stable through the treatment process. It is preferable to begin with annealed PET cloth, because without annealing, the fabric shrinks and as a result an adhesive bond cannot be formed. Preferably, the PET cloth is annealed at 350° F. for 30 seconds. PET cloth is available from Industrial Fabrics Corp of Minneapolis, Minn. and Sefar America, Inc of Depew, N.Y.

Other types of cloth, such as nylon and polyetheretherketone (PEEK), can be used for the soft septum.

It was surprisingly found that treatment of the cloth septum with a composition containing silane and an organic acid was effective to promote adhesion between the cloth septum and the honeycomb panel. The amount of silane present in the composition is between 1-8% by weight, and preferably 5% by weight. An example of a silane that can be used in the method of the invention is Silquest A-186 or A-187 (Momentive, Columbus, Ohio).

A suitable organic acid can be used such as, for example, acetic acid, potassium acetate, formic acid, butyric acid, and citric acid. Organic acids are available from U.S Chemicals (Darien, Conn.) and Cargill, Inc. (Naperville, Ill.). Only one acid can be used, or a blend of two or more acids can be made and used in the invention.

The adhesive used to bond the cloth septum to the honeycomb panel can be, for example, aerospace grade, off the shelf sheet adhesives such as epoxies, phenolics, bismaleimides and cyanoacrylates, or hot meltable plastics such as polyamides, polyolefins, polyamides and polyurethanes. These adhesives are available from Henkel Corp. (Bay Point, Calif.) and Cytec Engineered Material (Havre de Grace, Md.). It is desirable that the adhesive be resistant to fluids commonly found in jet engines, such as fuel, hydraulic fluid and water.

Preferably, the adhesive is a sheet adhesive which is applied to the honeycomb panel and is then reticulated. Reticulation is a well known process for the introduction of adhesives onto a honeycomb core. To reticulate, the adhesive sheet is heated, and warm air is blown through the softened adhesive. The adhesive sheet bursts and reforms on the surface of the honeycomb cell edge.

Composite panels with a soft septum disposed between a pair of opposed honeycomb panels can be made using the materials described above. The honeycomb panels have a pair of opposed sides and a plurality of contiguous cells with interior walls. The composite panel contains a treated septum made from a soft cloth positioned between two pieces of honeycomb using traditional aerospace assembly techniques and adhesives. The resulting structure has both good acoustic properties and good mechanical properties.

The method of making the composite panel with a soft septum sandwiched between a pair of honeycomb panels is made by first treating the septum with a composition comprising silane and an organic acid. The honeycomb panels are then placed on each of the opposite sides of the treated septum, with a heat curable adhesive between the panel and the treated septum. The adhesive is then cured.

Use of a cloth septum in the method of making the composite panel described herein results in cost savings in both material costs and labor costs as compared with other composite panels currently on the market.

The composite panel of the invention preferably has Rayl values between 60-100 and a nonlinearity factor (NLF) of less than 2. The composite panel of the invention preferably has mechanical properties of less than a 15% knockdown for the non-acoustic version of the same structure.

EXAMPLE

A composite panel of the invention was made in the manner set forth below.

First, a PET cloth was treated with a composition containing silane and an organic acid. This silane used was Silquest A-186 or A-187 (Momentive, Columbus, Ohio). The organic acid used was potassium acetate. The composition was prepared with 91 grams of potassium acetate, 1816 grams of Silquest A-186 and 34.413 kilograms of deionized water.

The PET cloth was immersed in the composition above for 2-3 seconds at room temperature. The PET cloth and composition was dried in an IR oven at approximately 300° F.

After the PET cloth was dry, a sheet adhesive (ED: FM 309) was placed on either side of the honeycomb core and reticulated. A honeycomb panel was then placed on top of the reticulated adhesive sheet on opposite sides of the PET cloth. The adhesive was then cured in an oven at 350° for 90 minutes.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A method for making a composite panel having a septum sandwiched between a pair of honeycomb panels, the honeycomb panels comprising a pair of opposed sides and a plurality of contiguous cells with interior walls, the method comprising the steps of:

(a) treating the septum with a composition comprising silane and an organic acid;

(b) placing a honeycomb panel on each of the opposite sides of the treated septum with a heat curable adhesive between the panel and the treated septum; and (c) curing the adhesive.

2. A method for making a composite panel comprising the steps of:
   (a) treating a septum having first and second opposed sides with a liquid composition comprising silane and an organic acid; and
   (b) adhesively bonding a first honeycomb panel to the first side of the treated septum and a second honeycomb panel to the second side of the treated septum thereby forming a sandwich of the septum between the two honeycomb panels.

3. The method of claim 2 wherein the step of adhesively bonding comprises applying an adhesive to the septum or the honeycomb panels or both.

4. The method of claim 3 comprising curing the adhesive by the application of heat.

5. The method of claim 2 wherein the septum comprises a polyethylene terephthalate (PET) cloth.

6. The method of claim 5 wherein the PET cloth comprises mesh openings between 10 to 30 microns.

7. The method of claim 5 wherein the PET cloth comprises between 305 to 550 threads per inch.

8. The method of claim 5 wherein the PET cloth comprises between 4 to 25% open area.

9. The method of claim 2 wherein the septum comprises nylon or polyetheretherketone (PEEK) cloth.

10. The method of claim 2 wherein the silane comprises an epoxy functional silane.

11. The method of claim 2 wherein the silane comprises 1 to 8% by weight of the composition.

12. The method of claim 2 wherein the organic acid comprises one or more of acetic acid, formic acid, butyric acid, and citric acid.

13. The product made by the method of claim 2.

14. A composite panel comprising a silane treated septum sandwiched between two honeycomb panels with a cured adhesive adhering the septum and honeycomb panels together.

15. A composite panel comprising a septum treated with silane and organic acid, wherein the treated septum is sandwiched between two honeycomb panels with a cured adhesive adhering the septum and honeycomb panels together.

16. The composite panel of claim 15, wherein the silane is dissolved in the organic acid prior to treatment of the septum.

\* \* \* \* \*